United States Patent [19]

Koons

[11] 4,027,059
[45] May 31, 1977

[54] ASPHALT-BASED COMPOSITIONS
[75] Inventor: Russell E. Koons, El Dorado, Ark.
[73] Assignee: Lion Oil Company, El Dorado, Ark.
[22] Filed: Oct. 14, 1975
[21] Appl. No.: 621,666
[52] U.S. Cl. .................................. 428/36; 106/279; 106/280; 106/281 N; 106/278; 106/273 N; 428/425; 260/77.5 AQ
[51] Int. Cl.² ................... C08L 95/00; F16L 58/10
[58] Field of Search .......................... 106/273–281; 260/28, 28.5; 428/36, 425

[56] References Cited
UNITED STATES PATENTS 3,259,512  7/1966  Dickson et al. .................... 106/273
3,615,802  10/1971  Betty et al. ........................ 106/278

Primary Examiner—Carman J. Seccuro

[57] ABSTRACT

A precursor composition, especially useful for making a patching and coating composition, and having unusual physical properties, comprises at least one non-air-blown, solvent extracted asphalt, at least one polyhydroxy polymer, at least one polyhydroxy compound, at least one polyamine, at least one solvent, and, optionally, at least one filler. This precursor composition, where combined with at least one polyisocyanate, forms a composition especially useful for coating and for patching coating.

19 Claims, No Drawings

ASPHALT-BASED COMPOSITIONS

The present invention relates to a precursor that is particularly useful for making a coating and patching composition, a composition especially useful for coating and patching comprising the precursor and at least one polyisocyanate, and substrates coated, at least partially, with the latter composition.

Pipelines such as those for conveying crude oil are usually buried in the ground and are protected against deterioration by coatings often prepard from an asphalt base. Known asphalt-based compositions have unsatisfactory physical properties were used to protect pipelines exposed to temperatures of −30° F. to −65° F. or to temperatures of up to 180° F. Another disadvantage of many protective compositions is that they are not serviceable after application until the solvent they contain evaporates. Such compositions are impractical for coating or for patching coatings on underground pipelines where such pipe must be promptly placed in or returned to service after coating or patching.

Accordingly, a principal object of this invention is to provide a composition especially useful for coating and for patching coatings at room or lower temperatures which cures rapidly at room temperature to a strong, hard, flexible coating, and has good physical properties at low and high temperatures.

In general, this invention provides a precursor composition, a composition especially useful for coating and patching coatings made from the precursor, and substrates coated, at least partially, with the latter composition. The precursor composition comprises: (a) at least one non-air-blown, solvent extracted asphalt having a penetration of about 0 to about 100, preferably about 10 to about 50, and more advantageously about 40 to about 50, and a softening point of about 220° to about 110°, preferably about 160° to about 120°, and more advantageously about 130° to about 120° F. (Penetration is measured in tenths of millimeters at 77° F. using ASTM D5-73, and softening point is measured using ASTM D36-70); (b) at least one polyhydroxy compound containing about 3 to about 15, preferably about 4 to about 10 carbon atoms, and 2 or 3 hydroxyl groups; (c) at least one intermediate polyhydroxy polymer having an average of at least about 1.8 predominantly primary, terminal, allylic hydroxyl groups per molecule that is an addition polymer of about 0 to about 75% by weight of an alpha-olefinic monomer of 2 to about 12 carbon atoms, and about 25 to 100% of a 1,3-diene hydrocarbon of 4 to about 12 carbon atoms, and having a viscosity at 30° C of about 5 to about 20,000 poises, the majority of its unsaturation in the main carbon chain, and a number-average molecular weight of about 400 to about 25,000; (d) at least one hydrocarbon solvent; and (e) at least one polyamine. Preferably, these compositions also contain; (f) at least one inert mineral filler. These compositions are surprisingly stable at standard temperature and pressure, and have long shelf life, often several months or more.

The non-air-blown solvent extracted asphalts constitute about 18 to about 55, preferably about 25 to about 35, parts by weight based on the weight of the precursor composition. These asphalts may, for example, be prepared by mixing an asphaltic flux or penetration grade asphalt with propane or a propane-$C_4$ and/or propane-$C_5$ hydrocarbon mixture and allowing the ingredients to separate into two layers. The solvent extracted asphalt is recovered from the bottom layer. Particularly useful solvent extracted asphalts are those prepared from a residuum of South Arkansas crude oil, although other crude oils may be used.

Solvent deasphalting is essentially a liquid-liquid extraction process which is used to separate paraffinic materials from atomatic and asphaltic materials in the reduced crude oil. The residual oil charge for solvent deasphalting comes from the flux oil fraction provided by the fractionation of crude oils. This process is especially well suited for crude oils which are difficult to reduce by steam and vacuum distillation. The solvent-to-charge ratios may vary considerably, but usually vary from a low of 2:1 to a high of 6:1. The minimum operable solvent-to-solvent charge ratio is highest for high paraffinic base residues, and lowest for low paraffinic base residues. Solvent extraction takes place in an extractor tower which serves as an intimate counter-current flow contactor for the solvent and residual oil charge. The deasphalted oil-solvent mixture flows from the top of the extractor tower, and the asphalt which is insoluble in the solvent is withdrawn from the bottom of the tower. Usually, the asphalt recovered from the bottom of the tower passes through an asphalt stripper which is a vertical column equipped with perforated baffle plates wherein steam is used for stripping the remaining solvent and oil in the asphalt.

The polyhydroxy compound component of the precursor composition is about 1 to about 14, preferably about 3 to about 9, parts by weight of the precursor composition, and preferably contains two hydroxyl groups per molecule. Most preferred is 2-methyl-2,4-pentanediol.

Generally, the inert mineral filler may be one kind or two or more different kinds of such fillers. Preferably, the filler is a finely divided solid with more than about 99% passing through a No. 325 mesh screen. Examples of solid fillers are powdered limestone, pulverized sand, silicas, clays, slate flour, and the like. Filler constitutes about 10 to about 38, preferably about 14 to about 21, and most preferably about 22 percent by weight of the precursor composition. Inert filler advantageously increases the tensile strength, hardness and elongation of the compositions of this invention, as the data in the examples show.

The intermediate polyhydroxy polymer constitutes about 14 to about 42, preferably about 22 to about 33, and most preferably about 27 parts by weight of the precursor composition of the invention. These polymers are described in detail in U.S.P. at No. 3,637,558, columns 3, 4 and 5. Preferably, this polymer is a liquid (at STP) hydroxyl terminated polybutadiene resin, most preferably having a molecular weight of about 2500.

The solvent in the precursor composition constitutes about 1 to about 17, preferably 1 to about 5, most preferably about 4, parts by weight of the precursor. Mixtures of two or more different solvents may also be used. Preferably, the solvent is aromatic. Examples of the solvents of the solvents of this invention are: naphthas, benzene, toluene, xylene, perchloro-ethylene and mixtures of aromatic hydrocarbons boiling in the range of about 300° to about 360° F.

The polyamine comprises about 0.5 to about 15, preferably about 3 to about 9, most preferably about 4, parts by weight of the precursor composition of this invention. Preferably, the polyamine is a diamine or or triamine containing 10 to about 60 carbon atoms, preferably 15 to about 25 carbon atoms. More preferably, the polyamine is an N-alkyl diamine or an alkylene diamino alkane. Examples of such amines are those prepared from long chains fatty acids and reacted with acrylonitrite to yield substituted propylamines, such as N-stearyl-1, 3-diaminopropane. These amines often contain mixed alkyl chains which occur in the natural oils from which they are prepared, such as tallow, soyabean oil, and coconut oil. Other examples are amines prepared from structures derived from propylene or ethylene glycols. These polyether amines vary considerably in molecular weight and structure. An example of such a diamine would be:

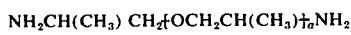

where $a$ is a whole or fractional number of at least 2.0 An example of the triamine would be:

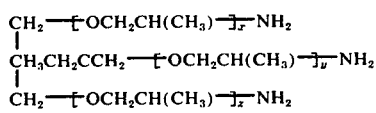

where the sum of $x,y$, and $z$ equals about 5.3 and each of $x,y$ and $z$ is greater than zero.

Optionally, the precursor composition may contain from about 0.1 to about 2.0, preferably about 0.5 to about 1.5, parts by weight of finely powdered desiccant such as a portland cement, silica gel and plaster of paris.

The precursor may be made by mixing the asphalt and inert mineral filler where filler is desirable, and heating the mixture to a temperature sufficient to dispel a substantial quantity of the air and moisture, generally about 400° to about 500° F., and, where necessary, adding one or more desiccants. The asphalt filler mixture is then cooled, if necessary, to a temperature below which degradation of the other ingredients is substantially avoided. Thus, the mixture may be cooled to about 400° F., and mixed in a moisture-free environment with the intermediate polyhydroxy resin. The mixture is cooled to about 250° F., the polyhydroxy compound is added and mixed, and the polyamine and solvent are added and mixed to form the desired composition.

The precursor composition is especially useful for making compositions useful for coating and for patching coatings. These compositions comprise the ingredients of the precursor composition plus at least one polyisocyanate, preferably a diisocyanate, and more preferably a polyphenylmethylene polyisocyanate. The weight ratio of the precursor to the polyisocyanate is determined by substantially equalizing the sum of the reactivities of the hydroxylated resin, polyamine, and polyhydroxy compound in the precursor with the reactivity of the polyisocyanate. In general, the weight ratio of precursor to polyisocyanate is less than about 30 to 1, usually less than about 15 to about 1, and preferably less than about 6 to 1. Upon mixing, the precursor and polyisocyanate react to produce a composition containing at least one urethane polymer, and non-air-blown, solvent extracted asphalt, solvent and, optionally, inert mineral filler described as (a), (d) and (f) above.

Thus when the precursor and the polyisocyanate components are mixed, a composition especially useful for coating and patching will include: (a) about 16 to about 50, usually about 20 to about 30, preferably about 25 percent by weight of the non-air-blown, solvent extracted asphalt, (b) about 1 to about 13, preferably about 3 to about 8, and most preferably about 5 percent by weight of the polyhydroxy compound, (c) about 13 to about 38, preferably about 20 to about 30, and most preferaly about 25, percent by weight of the intermediate polyhydroxy polymer, (d) about 0.5 to about 15, preferably about 0.5 to about 8, and most preferably about 4, percent by weight hydrocarbon solvent, (e) about 0.5 to about 13, preferably about 2 to about 7, and most preferably about 3.5 percent by weight polyamine, (f) where inert mineral filler is present, about 9 to about 35, preferably about 13 to about 25, and most preferably about 20 percent by weight inert mineral filler, and (g) about 2 to about 25, preferably about 10 to about 20, and most preferably about 16, percent by weight polyisocyanate.

The composition of this invention is particularly useful for coating substrates, especially metal substrates such as metallic pipe. For example, the coating is particularly advantageous for coating and patching coatings on steel and aluminum pipe. Generally, the coating will be from about 20 to about 150, preferably from about 50 to about 110, and most preferably about 80, mils in thickness and will contain about 12 to about 72, preferably about 28 to about 60 percent by weight urethane elastomer, and correspondingly, about 88 to about 28, and preferably about 72 to about 40% by weight of non-air-blown, solvent extracted asphalt, solvent, and where desired, filler. Surprisingly, these compositions produce coatings of desirably high tensile strength and elasticity, yet are quite tough and hard.

The coating may be applied by conventional techniques such as air atomization. Small quantities may be premeasured and mixed for brush or trowel application. The rate of cure increases as the temperature of the applied coating increases. Coating components are best kept warm and delivered to spray nozzles at about 65° F. or higher. Cure is accelerated by heating the coating to 75° F. and higher during application.

EXAMPLES

Following the procedure described above, two separate precursor compositions were prepared. Table I provides the details.

TABLE 1

| Precursor Composition Number | 1 | 2 |
|---|---|---|
| Constituent | Parts by Weight | Parts by Weight |
| Asphalt (1) | 29.5 | 30.8 |
| Slate Flour (Filler) | 26.0 | 26.0 |
| Polyol Resin (2) | 29.5 | 27.5 |
| Aliphatic Diamine (3) | 4.2 | 3.9 |
| 2-Methyl-2,4-Pentanediol | 5.8 | 2.8 |
| Aromatic Solvent (4) | 5.0 | 9.0 |

(1) Propane extracted non-air-blown asphalt having a penetration of 40–50 and a softening point of 128° F.
(2) A polybutadiene resin with terminal hydroxyl groups having a reactivity to isocyanate of about 0.80 milliequivalents per gram of resin (Arco's R45HT).
(3) A commercial grade of N-Stearyl-1,3-diaminopropane having a reactivity to isocyanate of 5.5 milliequivalents per gram.
(4) An aromatic solvent having a boiling range of 311–344° F., a specific gravity of 0.873 at 60°/60° F., and a flash point of 107° F. by the tag closed cup method.

Each of precursors 1 and 2 from Table I was mixed with polyphenylmethylene diisocyanate at a temperature of about 75° to about 85° F., samples were prepared from these mixtures, applied to primed pipe and subjected to various tests. Table II provides the details of the results of these tests. Table II shows that the compositions of this invention have high impact resistance at low temperatures, are readily applied at room temperature, and have good tensile strength, hardness, elasticity and resistance to cathodic disbonding upon cure. This is readily apparent from a comparison of the properties set forth in Table II to the properties of the known asphalt compositions set forth in Table I of U.S. Pat. No. 3,637,558.

TABLE II

| | Coating Made From Precursor 1, Table I | Coating Made From Precursor 2, Table I |
|---|---|---|
| Application Ratio (Precursor to polyisocyanate) | 5 to 1 | 8 to 1 |
| Preferred Mixing Temperature, °F. | 70 to 90 | 70 to 90 |
| Cure Time | | |
| To touch, hours | .25 to 1.5 | 1.25 |
| To firm, hours | .5 to 3.0 | 2.5 |
| Tensile Strength at break, one week cure, pulled at 1 cm/min. psi at 77° F. | 340 | 210 |
| Tensile Strength at 100% elongation, pulled at 1 cm/min. one week cure, psi at 77° F. | 288 | 132 |
| Troweling Time, minutes | 20 | 20 |
| Elongation at break, one week cure, pulled at 1 cm/min. % 77° F. | 140 | 188 |
| Service Temperature Range, °F. | −80 to 200 | −80 to 200 |
| Hardness, Shore A, 12 hrs. | 18 | 16 |
| Hardness, Shore A, 48 hrs. | 52 | 44 |
| Hardness, Shore A, one week | 72 | 52 |
| Cathodic Disbonding, 7 days, -1.5 volts, sq. inches (ASTM G8-72)(1) | 0.1 | 0.1 |
| Impact Resistance, inch pounds (ASTM E14-72) | | |
| at 77° F. | 60 | 50 |
| at 32° F. | 70 | 55 |
| at 0° F. | 80 | 80 |
| at −20° F. | 110 | 80 |
| at −65° F. | 100 | 100 |

(1) This test was made on steel pipe primed with Lion Oil N.C. Primer, and overcoated with the compositions of this invention.

I claim:

1. A composition comprising (a) at least one non-air-blown, solvent extracted asphalt having a penetration of about 0 to about 100 and a softening point of about 220° to about 110° F.,; (b) at least one polyhydroxy compound containing 3 to 15 carbon atoms and two or three hydroxyl groups; (c) at least one intermediate polyhydroxyl polymer having an average of at least 1.8 predominantly primary, terminal, allylic hydroxyl groups per molecule and being an addition polymer of 0 to about 75% by weight of an alpha-olefinic monomer of two to about twelve carbon atoms, and about 25 to 100% of a 1,3-diene hydrocarbon of 4 to about 12 carbon atoms, said intermediate polymer having a viscosity at 30° C of about 5 to about 20,000 poises, the majority of its unsaturation in the main carbon chain, and a number average molecular weight of about 400 to about 25,000; (d) at least one hydrocarbon solvent; and (e) at least one polyamine.

2. The composition of claim 1 further comprising: (f) at least one inert mineral filler.

3. The composition of claim 2 wherein the asphalt is about 18 to about 55 parts by weight, the polyhydroxy compound is about 1 to about 14 parts by weight, the inert mineral filler is about 10 to about 33 parts by weight, the polyhydroxy polymer is about 14 to about 42 parts by weight, the hydrocarbon solvent is about 1 to about 17 parts by weight, and the polyamine is about 0.5 to about 15 parts by weight of the composition.

4. The composition of claim 3 wherein the asphalt has a penetration of about 40 to about 50, and a softening point of about 130° to about 120° F., the polyhydroxy compound contains 4 to about 10 carbon atoms and 2 hydroxyl groups, the hydrocarbon solvent is aromatic and the polyamine contains 10 to 60 carbon atoms.

5. The composition of claim 4 wherein the polyhydroxy compound is 2-methyl-2,4-pentanediol, the inert mineral filler is slate flour, and the intermediate polyhydroxy polymer is a liquid hydroxyl-terminated polybutadiene resin.

6. The composition which comprises a mixture of the composition of claim 1 and at least one polyisocyanate.

7. The composition of claim 6 further comprising: (f) at least one inert mineral filler.

8. The composition of claim 7 wherein the polyisocyanate is a diisocyanate.

9. The composition of claim 8 wherein the diisocyanate is a polyphenylmethylene diisocyanate.

10. The composition of claim 7 wherein the composition is a coating composition.

11. The composition of claim 7 wherein the composition is a patching composition.

12. A substrate at least partially coated with a composition of claim 6.

13. A substrate at least partially coated with a composition of claim 7.

14. The substrate of claim 13 wherein the substrate is metallic.

15. The metallic substrate of claim 14 wherein the substrate is pipe.

16. A substrate coated at least partially with a composition comprising at least one non-air-blown, solvent extracted asphalt having a penetration of about 0 to about 100 and a softening point of about 220° to about 110° F.,; at least one hydrocarbon solvent; and a urethane polymer formed by the reaction of at least one polyhydroxy compound containing 3 to 15 carbon atoms and 2 or 3 hydroxyl groups, at least one intermediate polyhydroxy polymer having an average of at least about 1.8 predominantly primary, terminal allylic hydroxy groups per molecule and being an addition polymer of about 0 to about 75% by weight of an alpha-olefinic monomer of two to about twelve carbn atoms, and about 25 to about 100% of a 1,3-diene hydrocarbon of 4 to about 12 carbon atoms, said intermediate polymer having a viscosity at 30° C. of about 5 to about 20,000 poises, the majority of its unsaturation in the main carbon chain, and a number average molecular weight of about 400 to about 25,000, and at least one polyamine.

17. The substrate of claim 16 wherein the substrate is metallic.

18. The substrate of claim 17 wherein the substrate is pipe.

19. A method for preparing the composition of claim 2 comprising:
A. preparing a first mixture by mixing the non-air-blown solvent extracted asphalt with a sufficient amount of the inert mineral filler at a sufficient temperature to dispel a substantial quantity of air and moisture,
B. keeping said first mixture at a temperature to avoid substantial degradation of the ingredients thereof,
C. admixing said first mixture with the polyhydroxy polymer,
D. cooling the resulting mixture,
E. mixing the polyhydroxy compound with said resulting mixture,
F. admixing the polyamine and solvent with the resulting mixture from step (E).

* * * * *